(12) United States Patent
Takase et al.

(10) Patent No.: US 6,396,434 B1
(45) Date of Patent: May 28, 2002

(54) RADAR TRANSPONDER

(75) Inventors: Kazuyoshi Takase; Kiyoo Matsuura, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,043

(22) Filed: Jun. 20, 2000

(30) Foreign Application Priority Data

Jan. 20, 2000 (JP) ........................................ 2000-011540

(51) Int. Cl.[7] .............................................. G01S 13/06
(52) U.S. Cl. .............................. 342/51; 342/42; 342/44; 342/48; 342/147; 342/148; 342/453; 342/463
(58) Field of Search ............................... 342/42, 44, 46, 342/48, 51, 82, 83, 147, 148, 450, 453, 454, 463

(56) References Cited

U.S. PATENT DOCUMENTS 4,167,007 A * 9/1979 McGeoch et al. ............ 342/44
5,442,357 A * 8/1995 Dochi .......................... 342/51
5,748,139 A * 5/1998 Kawakami et al. ........... 342/51

FOREIGN PATENT DOCUMENTS

JP 407072243 A * 3/1995 ........... G01S/13/75

* cited by examiner

Primary Examiner—John B. Sotomayor
(74) Attorney, Agent, or Firm—Oblon, Spivak, McClelland, Maier & Neustadt, P.C.

(57) ABSTRACT

Upon receiving a radar electric wave from a search radar, a radar transponder according to the present invention generates a trigger signal in response to the reception of the radar electric wave. In response to only the trigger signal, the radar transponder starts to generate sweep signals, and continues to generate sweep signals until a stop condition based on an external factor such as stop of power supply or the like is satisfied. Accordingly, the response electric wave can be received with a high probability in the search radar.

14 Claims, 9 Drawing Sheets

FIG. 1
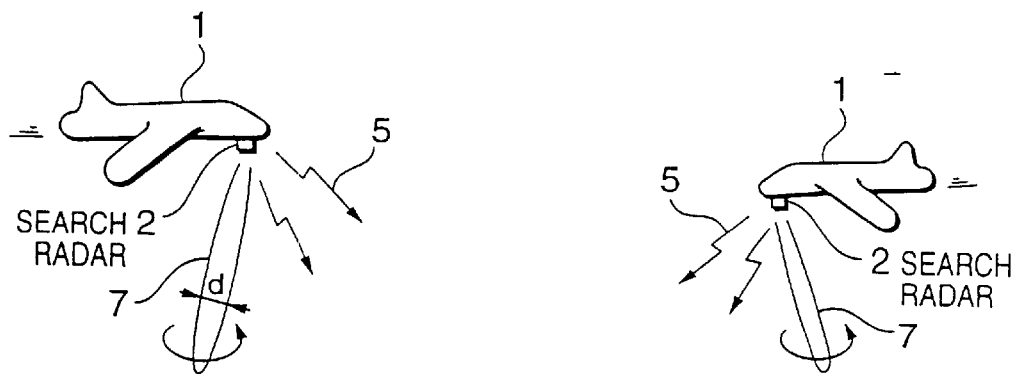
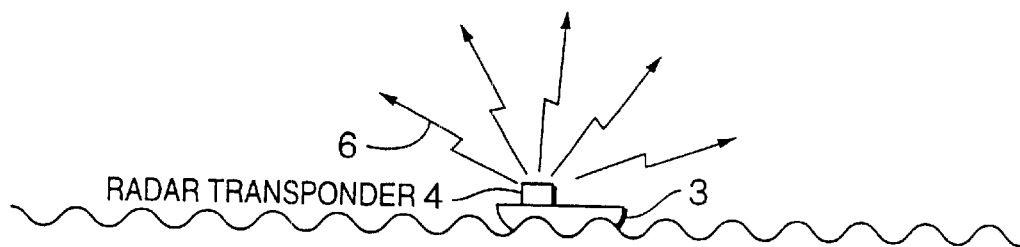
FIG. 2
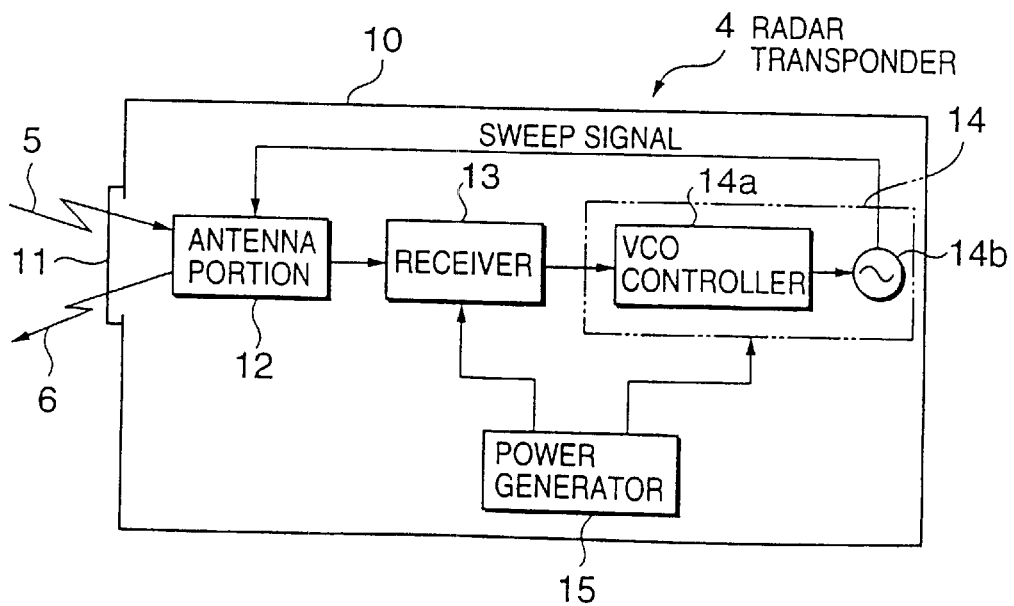

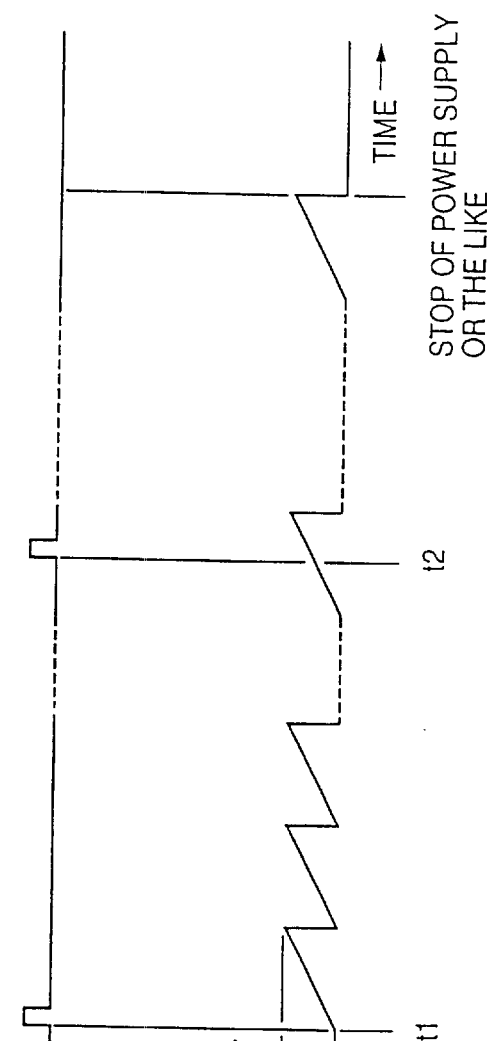

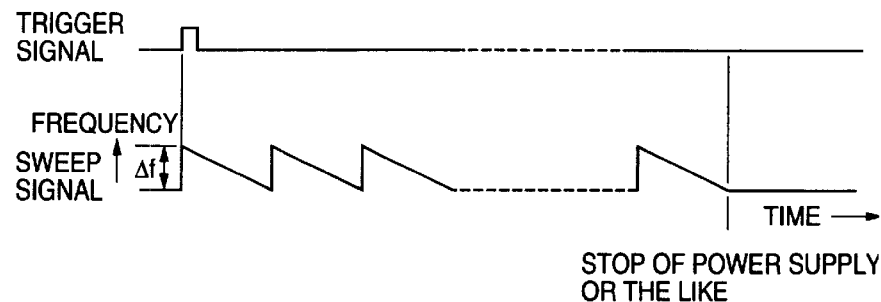
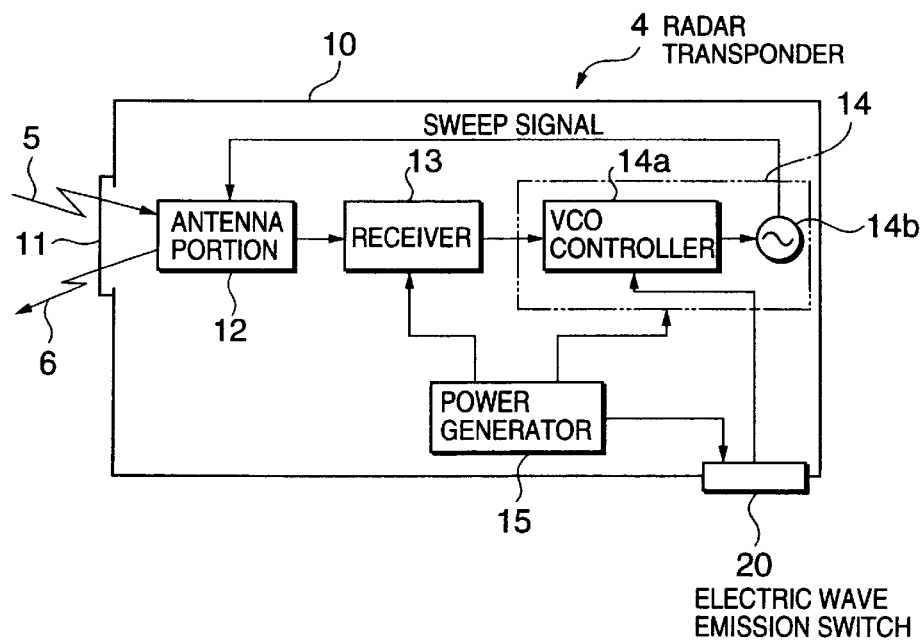

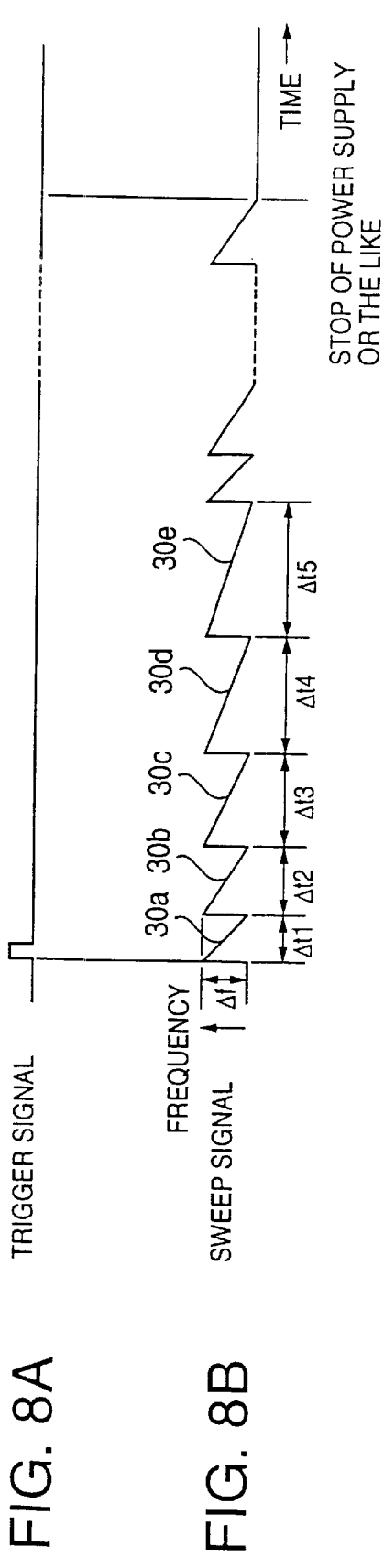

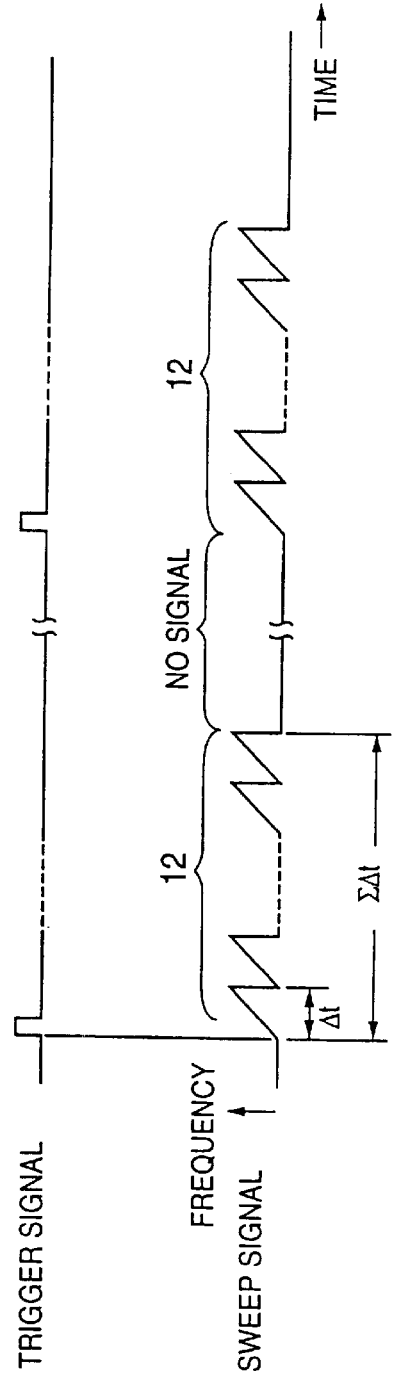

RADAR TRANSPONDER

BACKGROUND OF THE INVENTION

1. Field of the Invention

The present invention relates to a radar transponder serving as a lifesaving device for rescue activities.

2. Description of the Background Art

A radar transponder using electromagnetic waves of a radar frequency band (hereinafter referred to as "radar electric wave") has been hitherto known as a lifesaving device. The radar transponder serves to receive a radar electric wave emitted from a search radar installed in an air plane or the like, and then emits a response electric wave in response to the radar electric wave thus received. More specifically, the search radar emits the radar electric wave every predetermined emission period, and the emission period is set to 1 msec, for example. The above or another search radar receives the response electric wave from the radar transponder until it emits a next radar electric wave, whereby the search radar can known the locating position of the radar transponder.

Triggered by the reception of the radar electric wave transmitted from the search radar, the radar transponder generates a predetermined number of (for example, twelve) sweep signals. FIG. 11 is a waveform diagram showing the sweep signals generated in the conventional transponder.

The sweep time $\Delta T$ of each sweep signal is set to 8 $\mu$sec, for example. Accordingly, the time $\Sigma \Delta t$ needed to generate the twelve sweep signals is equal to 8×12=96 $\mu$sec. After generating the twelve sweep signals, the radar transponder does not generate any sweep signal until it receives the next radar electric wave. When receiving the next radar electric wave, the radar transponder generates a predetermined number of sweep signals again on the basis of the reception of the next radar electric wave as a trigger. The radar transponder repetitively executes the above processing to detect the radar transponder.

The search radar which emits the radar electric wave can basically receive the response electric wave from the radar transponder. However, there is a case where even a search radar which emitted a radar electric wave cannot receive a response electric wave thereto due to surrounding environments of the radar transponder. More specifically, for example when a radar transponder is mounted on a ship sailing on the sea, the passage of the response electric wave is intercepted by waves and thus the response electric wave hardly reaches the search radar. Further, the response electric wave emitted from the radar transponder is reflected from the surface of the sea and it becomes a multipass wave. Accordingly, even when the search radar is located near to the radar transponder, it could not capture the response electric wave if the electric field intensity of the response electric wave is small. In this case, if the reception sensitivity of the search radar is low, it is more difficult to capture the response electric wave.

In order to avoid these disadvantages, it may be considered that a radar transponder is searched by using a plurality of search radars. In this case, even when a search radar emitting a radar electric wave cannot receive the response electric wave, another search radar which does not emit the radar electric wave may be located at a position where the passage of the response electric wave is not intercepted, or the electric field intensity of the response electric wave is large. Accordingly, in such a situation, it apparently seems to be possible that another search radar which does not emit the radar electric wave can receive the response electric wave.

However, even when any search radar which does not emit the radar electric wave is located at such a position, it is not necessarily possible for the search radar to receive the response electric field because the probability that the search radar can receive the response electric wave is very small.

More specifically, the search radar periodically scans the reception beam over 360 degrees because the incoming direction of the response electric wave is unclear. Further, in order to limit the existence direction of the radar transponder to a relatively narrow range, the beam width of the reception beam is set to an extremely narrow value, for example, 3 degrees. Accordingly, in this case, the probability P1 that the reception beam is directed to the existence direction of the radar transponder is equal to 3 degrees/360 degrees=about 0.008. In other words, the probability that the response electric wave transmitted from the radar transponder can be received is equal to 0.008.

The time period for which the radar transponder can emit the response electric wave is limited to an extremely small time after the radar transponder receives the radar electric wave. That is, the emission time of the response electric wave is equal to 8×12=96 $\mu$sec if the radar transponder generates twelve sweep signals like the case described above. Accordingly, taking into consideration that the emission period of the radar electric wave is equal to 1 msec, the probability P2 that the response electric wave can be received during 1 msec is equal to 96 $\mu$sec/1000 $\mu$sec=0.096.

From the above result, the probability P that the search radar can receive the response electric wave is equal to P1×P2=0.008×0.096=0.000768. Therefore, even when one radar transponder is searched by plural search radars, there occurs a problem that the search activities are obstructed.

SUMMARY OF THE INVENTION

Therefore, an object of the present invention is to solve the problems of the above technique, and provide a radar transponder which can receive a response electric wave with high probability by a search radar.

In order to attain the above object, a radar transponder according to the present invention is characterized by including a trigger signal output unit for outputting a trigger signal in response to a predetermined trigger generating condition, and a transmitter for continuously generating plural sweep signals in response to the output of the trigger signal from the trigger signal output unit until a stop condition based on an external factor is satisfied, and transmitting a response electric wave corresponding to the sweep signals thus generated.

According to the radar transponder thus constructed, the sweep signals are continuously generated in response to the output of the trigger signal until the stop condition based on the external factor is satisfied, and thus the response electric wave can be emitted for a longer time period as compared with the conventional radar transponder. Accordingly, the radar transponder concerned can be detected with a higher probability by a search radar which searches the radar transponder. Therefore, the radar transponder according to the present invention can more effectively support lifesaving, etc.

As the stop conditions based on the external factor may be considered a stop operation of power supply to the transmitter, a manual instruction to stop the emission of the response electric wave, etc. Further, as the trigger generating conditions may be considered a reception operation of a radar electric wave emitted from a search radar, a manual instruction to emit a response electric wave, etc., detection of a predetermined fixed amount or more seawater, detection of a predetermined fixed amount or more impact, etc.

BRIEF DESCRIPTION OF THE DRAWINGS

FIG. 1 is a diagram showing the construction of a search system to which a radar transponder according to a first embodiment of the present invention is applied;

FIG. 2 is a block diagram showing the internal construction of the radar transponder;

FIG. 3A is a waveform diagram showing trigger signals;

FIG. 3B is a waveform diagram showing sweep signals;

FIG. 5A is a waveform diagram showing trigger signals;

FIG. 5B is a waveform diagram showing another example of sweep signals;

FIG. 6 is a block diagram showing the internal construction of a radar transponder according to a second embodiment of the present invention;

FIG. 8A is a waveform diagram showing trigger signals;

FIG. 8B is a waveform diagram showing another example of sweep signals;

FIG. 11A is a waveform diagram showing trigger signals;

FIG. 11B is a waveform diagram showing sweep signals generated in a conventional radar transponder.

DETAILED DESCRIPTION OF THE PREFERRED EMBODIMENTS

Figure 4A:
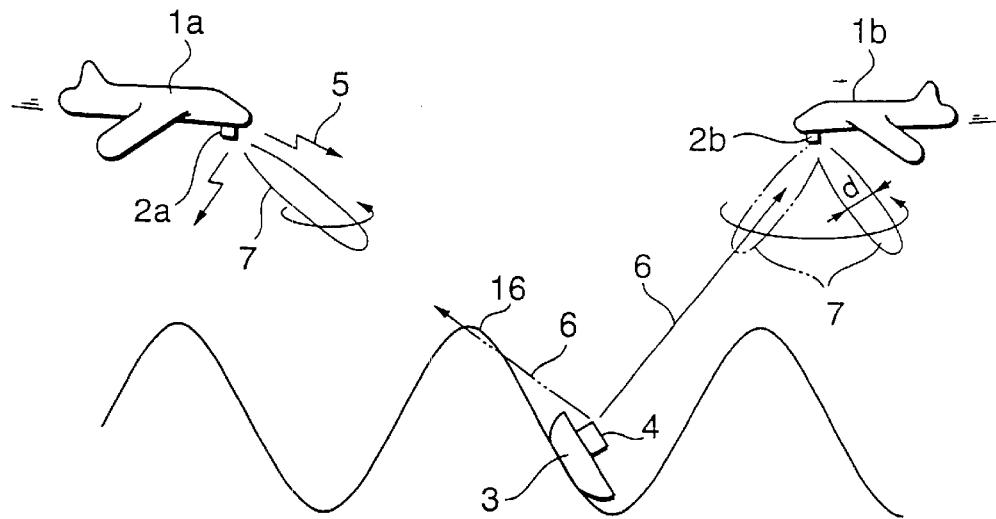
FIGS. 4A and 4B are diagrams showing specific search situations.

Preferred embodiments according to the present invention will be described with reference to the accompanying drawings.

[First Embodiment]

FIG. 1 is a diagram showing the overall construction of a search system to which a radar transponder according to a first embodiment of the present invention is applied.

The search system of this embodiment includes a search radar 2 mounted in a searching body 1 such as an air plane or the like, and a radar transponder 4 mounted in a search target 3 such as a ship or the like. The search radar 2 emits a radar electric wave 5 which is an electromagnetic wave of a radar frequency band. The radar transponder 4 receives the radar electric wave 5 and emits a response electric wave 6 in response to the reception of the radar electric wave 5. The search radar 2 receives the response electric wave 6 emitted from the radar transponder 4 to process the response signal corresponding to the response electric wave 6, thereby specifying the locating position of the radar transponder 4.

More specifically, the search radar 2 emits the radar electric wave 5 every predetermined emission period. The emission period is set to 1 msec, for example. This emission period is set so that after the search radar 2 emits a radar electric wave 5, a next radar electric wave 5 is not emitted until the search radar 2 receives the response electric wave corresponding to the former radar electric wave. That is, the emission period is settled on the basis of the maximum searchable distance of the search radar 2 or the like.

The search radar 2 also forms a reception beam 7 for receive the response electric wave 6. The search radar 2 periodically scans the reception beam 7 over 360 degrees because the incoming direction of the response electric wave 6 is unclear. The scan period is set to 500 msec, for example. In addition, the beam width d of the reception beam 7 is set to a relatively narrow range so that the location (existence) direction of the radar transponder to be detected is limited to a narrow range. For example, the beam width d of the reception beam 7 is set to 3 degrees.

FIG. 2 is a block diagram showing the internal construction of the radar transponder 4. The radar transponder 4 includes a housing 10. An opening portion is formed at a part of the housing 10, and the opening portion is covered by a radome 11. The radome 11 serves to transmit the radar electric wave 5 and the response electric wave 6 therethrough and protect the inside of the housing 10.

The housing 10 contains an antenna potion 12, a receiver 13 which is electrically connected to the antenna portion 12, a sweep signal generator 14 which is electrically connected to the receiver 13, and a power generator 15 which is electrically connected to the receiver 13 and the sweep signal generator 14. The power generator 15 is composed of a battery, for example, and it serves to supply required power to the receiver 13 and the sweep signal generator 14.

More specifically, the antenna portion 12 is commonly used in both of the transmission and reception operations, and it serves to receive the radar electric wave 5 transmitted through the radome 11 and emits the response electric wave 6 into the air. The antenna portion 12 supplies the receiver 13 with a radar signal which is the electric signal corresponding to the radar electric wave 5 received. The receiver 13 creates a pulse-shaped trigger signal in response to the trigger generating condition that the radar electric wave 5 is received, that is, the radar signal is received. More specifically, in response to the trigger generating condition that the radar signal is received, the receiver 13 amplifies and then detects the radar signal to create the pulse-shaped trigger signal. In other words, the receiver 13 creates the pulse-shaped trigger signal in response to the fact that the trigger generating condition indicating the reception of the radar signal is satisfied. The receiver 13 outputs the trigger signal thus created to the sweep signal generator 14. That is, in the first embodiment, the receiver 13 corresponds to "the trigger signal output unit" in the claims.

The sweep signal generator 14 continues to generate sweep signals each having a predetermined waveform on the basis of the trigger signal output from the receiver 13 until a stop condition based on an external factor is satisfied. More specifically, in response to the trigger signal output from the receiver 13, the sweep signal generator 14 continues to generate the sweep signals until the stop condition based on the external factor is satisfied. The sweep signals generated in the sweep signal generator 14 are supplied to the antenna portion 12 and emitted as a response electric wave from the antenna portion 12 into the air. That is, in the first embodiment, the antenna portion 12 and the sweep signal generator 14 correspond to the "transmitter" in the claims.

The sweep signal generator 14 will be further described in more detail. The sweep signal generator 14 contains a VCO (Voltage Controlled Oscillator) controller 14a and a VCO unit 14b. The VCO controller 14a controls the VCO unit 14b to generate sweep signals each having a predetermined waveform. Sweep information is preset in the VCO controller 14a. The sweep information contains a sweep time, an oscillation frequency width and a slope direction. In the first embodiment, the sweep time is set to 8 μsec, for example. The oscillation frequency width Δf is set to 9200 MHz to 9500 MHz, for example. The slope direction is set so that the oscillation frequency increases with the time lapse.

Under the operation, the trigger signal described above is input to the VCO controller 14a. In response to the input of the trigger signal, the VCO controller 14a continuously supplies the VCO unit 14b with a voltage signal indicating the sweep information so that the sweep signals of the predetermined waveform are generated in the VCO unit 14b.

The VCO unit 14b creates the sweep signals on the basis of the voltage signal supplied from the VCO controller 14a. More specifically, the VCO unit 14b creates the sweep signals based on the sweep information corresponding to the voltage signal. Since the voltage signal is continuously supplied as described above, the VCO unit 14b continuously and repetitively creates the sweep signal, whereby the sequential sweep signals are created.

As described above, the sweep signal generator 14 continues to generate the sweep signals until the stop condition based on the external factor is satisfied. Here, the stop condition based on the external factor is a condition which occurs outside the sweep signal generator 14, and thus it is different from such a programmed condition that it is programmed in the sweep signal generator 14 to automatically stop the generation of the sweep signals when a predetermined sweep signals are generated.

For example, it is identified as a stop condition that the power supply from the power generator 15 to the sweep signal generator 14 is stopped. For example, when the power generator 15 is composed of a battery, the wasting of the battery means the stop condition. When the power supply is stopped, the generation of the sweep signals is stopped unconditionally. Furthermore, it is also identified as a stop condition that an emission stop switch is manually operated by a user. For example, since it is unnecessary to further emit the response electric wave after the radar transponder 4 is detected by the search radar, a manual instructing that the user manually operates the emission stop switch in such a situation is prepared in advance.

In the first embodiment, even when second and subsequent trigger signals are supplied from the receiver 13 to the VCO controller 14a, the VCO controller 14a neglects these trigger signals and continues to output the voltage signal. After the VCO unit 14b starts to generate the sweep signal, it continues to generate the sweep signal without clearing the sweep signal.

FIG. 3 is a waveform diagram showing the sweep signal. The sweep signal is started to be generated in response to a timing t1 at which a first trigger signal is output, and subsequently it is continually generated. In this case, the respective sweep signals have the completely same waveform. Even when the second trigger signal is output at a timing t2, the sweep signals are continually generated with neglecting the output of the second trigger signal. The generation of the sweep signals is forcedly stopped in the case where the stop condition such as the stop of the power supply or the like is satisfied.

Figure 4B:
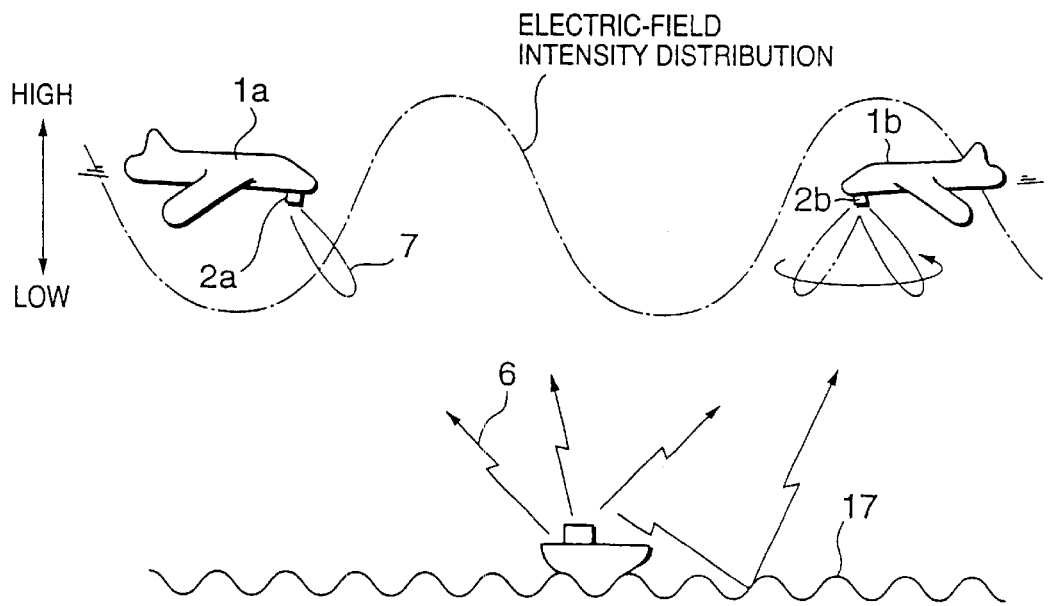

FIGS. 4A and 4B are diagrams showing such a search situation that the same kinds of search radars 2a, 2b are respectively mounted in two searching bodies 1a, 1b, and a radar transponder 4 is mounted in a compact ship (for example, lifesaving boat) 3. FIG. 4A shows a situation where the ship 4 sails on such rough sea that billows 16 are rising. In this case, the search radars 2a and 2b emit the radar electric waves of the inherent radar frequencies thereto. It is assumed that the radar electric wave 5 from one search radar 2a is received by the radar transponder 4. The radar transponder 4 starts to emit the response electric wave 6 in response to the reception of the radar electric wave 5. As described above, the emission of the response electric wave is continued until the stop condition based on the external factor such as the wasting of the battery or the like is satisfied.

However, when the billows 16 rise, the passage of the response electric wave 6 emitted from the radar transponder 4 may be intercepted by the billows 16, and thus the response electric wave 6 may not reach the search radar 2a which emits the radar electric wave 5. In this case, even when the reception beam 7 of the search radar 2a is directed to the radar transponder 4, it is difficult for the search radar 2a to receive the response electric wave 6 excellently.

On the other hand, the response electric wave 6 may reach another search radar 2b located in a direction along which the passage of the response electric wave 6 is not intercepted by billows 16. However, the reception beam 7 of the other search radar 2b is periodically scanned over 360 degrees, and the beam width d thereof is set to be very narrow. Accordingly, the opportunity that the response electric wave 6 is received by the other search radar 2b is restricted.

However, the response electric wave 6 according to the first embodiment 1 is associated with the sequential sweep signals, and thus the reception probability of the response electric wave 6 by the search radar 2b is very high even when the reception opportunity of the response electric wave 6 by the search radar 2b is small. That is, the reception probability P2 of the response electric wave 6 to the emission period of the radar electric wave 5 in the search radar 2b is unlimitedly approached to 1, so that the reception probability P of the response electric wave 6 in the search radar 2b is equal to a large value. Accordingly, the locating position of the radar transponder 4 can be detected with a high probability by the search radar 2.

FIG. 4B shows a situation where the response electric wave 6 becomes a so-called multipass wave. As described in the "Background of the Art", the response electric wave 6 emitted from the radar transponder 4 is reflected from the surface 17 of the sea or the like and becomes a multipass wave in the sky. As a result, the electric field intensity distribution of the response electric wave in the sky is dispersed as indicated by a one-dotted chain line of FIG. 4B. Accordingly, the search radar 2a locating at a position where the electric field intensity is relatively low (hereinafter referred to as "low-intensity position") hardly receives the response electric wave 6. On the other hand, the search radar 2b locating at a position where the electric field intensity is relatively high (hereinafter referred to as "high-intensity position") can receive the response electric wave 6 excellently. In addition, since the response electric wave 6 is associated with the sequential sweep signals, the response electric wave 6 can be excellently received in the search radar 2b even when the probability that the reception beam 7 of the search radar 2b faces in the locating direction of the radar transponder 4. Therefore, even when a multipass wave occurs, the radar transponder 4 can be detected with a high probability by any one of the plural search radars 2a, 2b.

The reception sensitivity is considered at the performance of the search radar 2. Although the search radar 2 has a relatively high reception sensitivity, there is a case there the search radar 2 could not receive the response electric wave 6 excellently if the search radar 2 is located at a low-intensity position. However, according to the first embodiment, since the response electric wave 6 is emitted over a long term, the probability that the response electric wave 6 can be excellently received in the search radar 2 is high although it takes some time for the searching body 1 containing the search radar 2 to move to a high-intensity position. Therefore, the radar transponder 4 can be detected with a high probability in the search radar 2.

As described above, according to the first embodiment, the sweep signals are sequentially generated in response to the reception of the radar electric wave 5, so that the response electric wave can be received with a high probability in the search radar 2. In addition, the response electric wave 6 can be received with a high probability by any one of plural search radars 2 irrespective of the waves on the sea, the multipass wave and the radar performance. Accordingly, the radar transponder 4 can be detected with a high probability by the search radar 2. Therefore, the detection probability of the radar transponder 4 can be enhanced, and the lifesaving, etc. can be strongly assisted.

Further, the response electric wave is continued to be emitted until the power supply is stopped or the stop of the emission of the electric wave is manually instructed, so that the response electric wave 6 can be continued to be emitted over a very long term. Therefore, the search radar 2 is enabled to detect the radar transponder 4 with a higher probability.

Still further, since the sweep signals are first continually generated in response to the reception of the radar electric wave, it is afterwards sufficient to carry out only the processing of continually generating the sweep signals. Accordingly, the processing can be more simplified as compared with the conventional technique of carrying out the processing of generating the sweep signals every time the radar electric wave is received. Therefore, the power consumption can be suppressed to a relatively small value, and thus the time for which the sweep signals are generated can be increased. Accordingly, the probability that the radar transponder 4 is detected can be further enhanced, and the lifesaving, etc. can be more strongly assisted.

In the foregoing description, the sweep signals are sloped so that the oscillation frequency thereof is increased with the time lapse. In the existing search radars, some search radars 2 can process the sweep signals in such a slope direction, but some other search radars 2 cannot process any sweep signal in such a slope direction. For example, some search radars 2 can process only sweep signals which are sloped so that the oscillation frequency is reduced with the time lapse. Accordingly, in order to support these search radars 2, sweep signals which are sloped so that the oscillation frequency is reduced with the time lapse may be generated as shown in FIG. 5.

[Second Embodiment]

FIG. 6 is a block diagram showing the internal construction of the radar transponder 4 according to a second embodiment of the present invention. In FIG. 6, the elements having the same functions as those of FIG. 2 are represented by the reference numerals.

In the first embodiment, the sweep signals are generated in response to the reception of the radar electric wave 5 transmitted from the search radar 2, and the response electric wave 6 is emitted. However, there may be a case where the radar electric wave 5 from the search radar 2 does not arrive at the radar transponder 4 due to some cause. Therefore, in the second embodiment, the response electric wave 6 is enabled to be emitted even when the radar electric wave 5 from the search radar 2 does not arrive at the radar transponder 4.

More specifically, the radar transponder 4 according to the second embodiment is provided with an electric wave emission switch 20. The electric wave emission switch 20 is secured to the housing 10, and it is operated by the user. The electric wave emission switch 20 is electrically connected to the sweep signal generator 14, and outputs a trigger signal to the sweep signal generator 14 in response to the user's operation. That is, in the second embodiment, the receiver 13 and the electric wave emission switch 20 correspond to the trigger signal output unit in the claims. The sweep signal generator 14 starts to generate the sweep signals in response to the reception of the trigger signal, and continues to generate the sweep signals until the power supply of the power generator 15 is stopped or the emission stop switch (not shown) is operated.

As described above, according to the second embodiment, even when the radar electric wave 5 does not arrive at the radar transponder 4 due to some cause, the emission of the response electric wave 6 can be manually instructed by a user. In addition, since the response electric wave 6 is sequentially emitted, the response electric wave can be captured with a high probability by the search radar 2. Therefore, the detection probability of the radar transponder 4 can be greatly enhanced.

In the foregoing description, the instruction of emitting the response electric wave is made by the manual operation of the user. However, the emission of the response electric wave 6 may be automatically instructed to the sweep signal generator 14, not by the user's manual operation, but in response to the fact that the a condition indicating a wreckage or the like is satisfied.

More specifically, the radar transponder 4 of this embodiment is provided with a seawater detection sensor in place of the electric wave emission switch 20. The seawater detection sensor serves to output a trigger signal to the sweep signal generator 14 in response to the fact that a predetermined fixed amount or more seawater comes into contact with the surface of the sensor. That is, in this case, the receiver 13 and the seawater detection sensor correspond to the trigger signal output unit in the claims. The sweep signal generator 14 starts to continue generation of sweep signals in response to the reception of the trigger signal.

According to this embodiment, for example when a ship 3 having a radar transponder 4 mounted therein is wrecked and the seawater invades into the ship 3, the response electric wave 6 can be automatically emitted without any person's hands. Accordingly, even when any user cannot touch the radar transponder 4 under the confusion of wreckage, the response electric wave 6 can be emitted toward the search radar 2. Therefore, the radar transponder 4 can be detected with a high probability by the search radar 2, and thus the detection probability of the radar transponder 4 can be enhanced.

Furthermore, the radar transponder 4 may be provided with an impact sensor in place of the seawater detection sensor. The impact sensor serves to output a trigger signal to the sweep signal generator 14 in response to the fact that a predetermined fixed amount or more impact is imposed on the ship. That is, in this case, the receiver 13 and the impact sensor correspond to the trigger signal output unit in the claims. The sweep signal generator 14 starts to continue generation of sweep signals in response to the reception of the trigger signal.

According to this construction, for example when the radar transponder 4 is impinged against the floor or wall due to wreckage, the response electric wave can be automatically emitted. Accordingly, even when any user cannot touch the radar transponder 4 under the confusion of wreckage, the response electric wave 6 can be emitted toward the search radar 2. Therefore, the radar transponder 4 can be detected with a high probability by the search radar 2, and thus the detection probability of the radar transponder 4 can be enhanced.

Still furthermore, in the foregoing description, the radar transponder 4 is provided with the receiver 13 for receiving the radar electric wave 5 from the search radar 2. However, the radar transponder 4 may be provided with no receiver 13, but with only the electric wave emission switch, etc. With this construction, the radar transponder 4 can be simplified in construction, and thus the weight and cost of the radar transponder 4 can be reduced, so that the radar transponder 4 can be more readily mounted in the ship 3, etc.

[Third Embodiment]

Figures 7A, 7B:
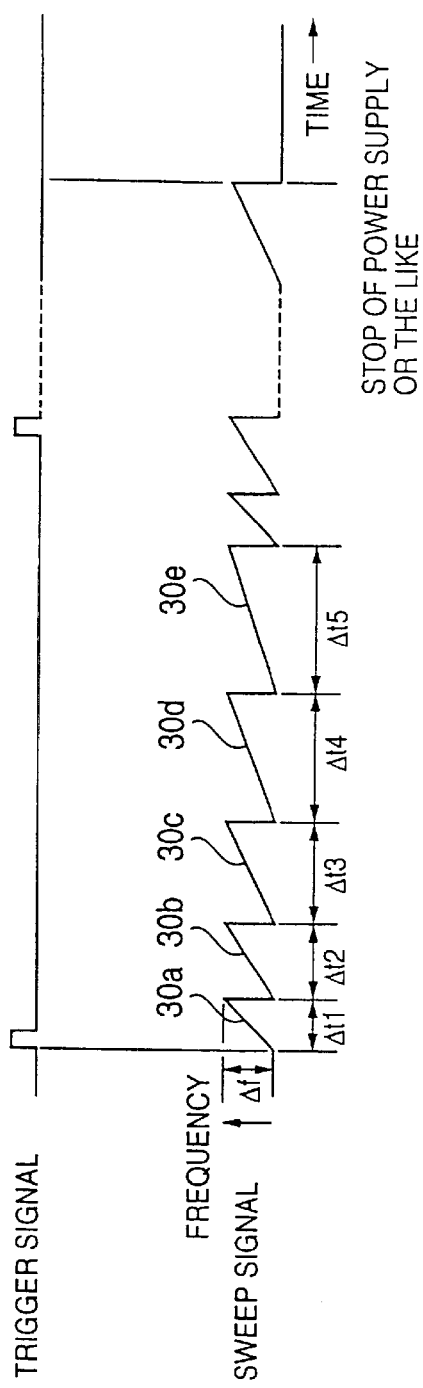
FIG. 7A is a waveform diagram showing trigger signals.
FIG. 7B is a waveform diagram showing sweep signals generated in a radar transponder according to a third embodiment of the present invention.

FIG. 7 is a waveform diagram showing sweep signals in a radar transponder 4 according to a third embodiment of the present invention. In the third embodiment, the description will be made by referring to FIG. 2 if occasion demands.

In the first and second embodiments, the radar transponder 4 is assumed to emit the response electric wave 6 which can be detected by one type of search radars 2. That is, the radar transponder 4 is assumed to sequentially generate sweep signals having the same waveform. However, in the third embodiment, the radar transponder 4 is assumed to emit a response electric wave 6 which can be detected by plural kinds of search radars 2.

Recent search radars contain a so-called pulse-compression radar which has been developed to increase the detection distance and enhance the distance resolution. That is, there is a case where pulse-compression radars and the other type of radars are used in combination as search radars to search and detect a radar transponder. Further, the pulse-compression radars themselves are also classified into various types of radars which process sweep signals having different waveforms. Therefore, in this case, the radar transponder is searched by using three or more types of search radars.

The use of different types of search radars means that the waveform is different among the sweep signals to be processed by these search radars. As a case where the sweep signals are different in waveform, there may be considered such a situation that the sweep signals are different in sweep time although they have the same slope direction and the same oscillating frequency width Δf. That is, the slope angle of the sweep signal is different. In order to support such plural types of search radars 2 as described above, the radar transponder according to the third embodiment is designed so as to sequentially and periodically generate sweep signals which are different in sweep time.

More specifically, plural pieces of sweep information which are respectively associated with plural assumed types of search radars 2 as described above are held in the VCO controller 14a in advance. The VCO controller 14a sequentially (continuously) and periodically supplies the VCO unit 14b with a voltage signal indicating the sweep information corresponding to each search radar 2. For example, when the VCO controller 14a of the radar transponder 4 holds the sweep information of five types of search radars 2, the VCO controller 14a sequentially outputs voltage signals indicating five different waveforms respectively, and then sequentially outputs the voltage signals indicating the five different waveforms again. This process is repetitively carried out.

The VCO unit 14b generates the sweep signals having the waveforms corresponding to the voltage signals output from the VCO controller 14a. More specifically, for example when voltage signals indicating five different waveforms are sequentially and periodically supplied, the VCO unit 14b sequentially generates the sweep signals having five different waveforms, and repeats the generation of these sweep signals, whereby the sweep signals having different waveforms are sequentially and periodically generated.

More specifically, the VCO unit 14b generates a first sweep signal 30a having a sweep time Δt1 for a first search radar. Sequentially to the first sweep signal 30a, the VCO unit 14b generates a second sweep signal 30b having a sweep time Δt2 for a second search radar whose type is different from that of the first search radar. Further, the VCO unit 14b generates third, fourth and fifth sweep signals 30c, 30d and 30e of Δt3, Δt4 and Δt5 in sweep time for third, fourth and fifth search radars respectively one by one sequentially to the second, third and fourth sweep signals 30b, 30c and 30d respectively. The VCO unit 14b sequentially outputs the first to fifth sweep signals 30a to 30e, and then repetitively carries out the above one cycle output operation.

The generation of the sweep signals is continued until the power supply from the power generator 15 is stopped or the emission stop switch is operated as in the case of the first embodiment.

As described above, according to the third embodiment of the present invention, the sweep signals having the waveforms corresponding to the types of the search radars 2 are sequentially and periodically generated. Therefore, even when the radar transponder 4 is searched by plural types of search radars 2, the radar transponder 4 can be detected with a high probability by any one of the search radars 2. Accordingly, the detection probability of the radar transponder 4 can be further enhanced, and the lifesaving, etc. can be more strongly assisted.

In the foregoing description, the slope direction of each of the first to fifth sweep signals 30a to 30e is set so that the oscillating frequency is increased with the time lapse. However, the slope direction of each of the first to fifth sweep signals 30a to 30e may be set so that the oscillating frequency is reduced with the time lapse in accordance with the type of the search radar 2 as shown in FIG. 8.

Further, in the foregoing description, the first to fifth sweep signals 30a to 30e are generated one by one. However, the first to fifth sweep signals 30a to 30e may be generated every plural sweep signals. In this case, the same number or different numbers of the first to fifth sweep signals 30a to 30e may be generated sequentially.

[Fourth Embodiment]

Figures 9A, 9B:
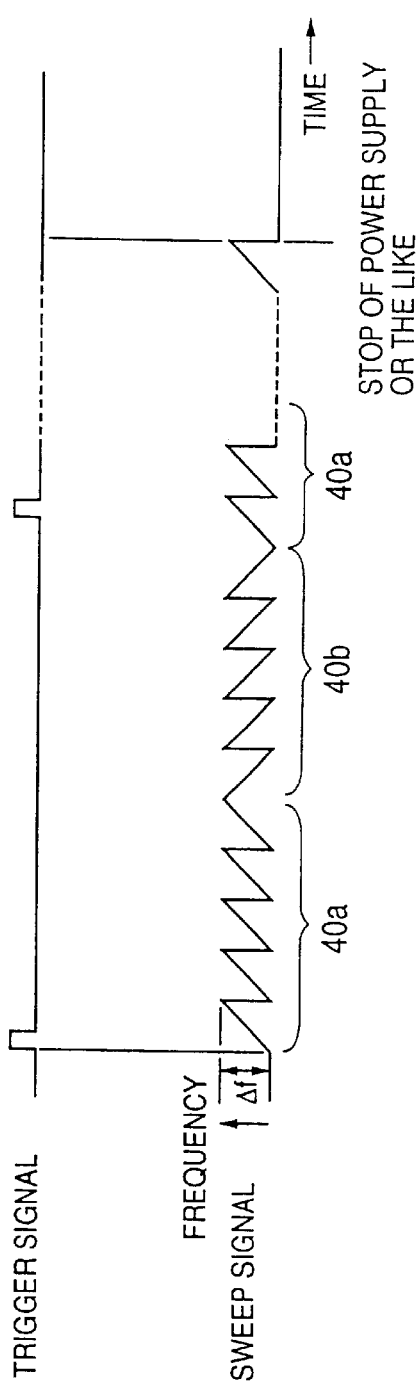
FIG. 9A is a waveform diagram showing trigger signals.
FIG. 9B is a waveform diagram showing sweep signals generated in a radar transponder according to a fourth embodiment of the present invention.

FIG. 9 is a waveform diagram showing the sweep signals in a radar transponder 4 according to a fourth embodiment of the present invention. In the fourth embodiment, FIG. 2 will be referred to if occasion demands.

In the third embodiment, the slope direction and the oscillating frequency width Δf are unvaried among the sweep signals, and only the sweep time is varied. Actually, there is such a type of search radar which is different only in slope direction from that of the other types of search radars. Therefore, the fourth embodiment is related to a radar transponder 4 which can support plural types of search radars 2 which are the same in oscillating frequency width Δf and sweep direction, but different in slope direction.

More specifically, in the fourth embodiment, there are assumed two types of search radar which are the same in oscillating frequency width Δf and sweep time, and opposite to each other in slope direction. The VCO controller 14a holds two kinds of sweep information (first sweep information and second sweep information). The first sweep information is associated with a first search radar 2, and it is set on the assumption that the oscillating frequency is increased with the time lapse. The second sweep information is associated with a second search radar, and it is set on the assumption that the oscillating frequency is reduced with the time lapse. In this case, the sweep time and the oscillating frequency width Δf are the same between the two types of search radars 2.

The VCO controller 14a sequentially outputs only a predetermined number of first voltage signals each indicating the first sweep information, and then sequentially outputs only a predetermined number of second voltage signals each indicating the second sweep information. After outputting the last second voltage signal, the VCO controller 14a starts to output the first voltage signals again subsequently to the last second voltage signal. That is, the VCO controller 14a repetitively outputs the first and second voltage signals.

In accordance with the first voltage signals, the VCO unit 14b sequentially generates a predetermined number (for example, five) of first sweep signals 40a which are set so that the oscillating frequency is increased with the time lapse, and then in accordance with the second voltage signals the VCO unit 14b sequentially generates a predetermined number (for example, five) of second sweep signals 40b which are set so that the oscillating frequency is reduced with the time lapse. Further, the VCO unit 14b repetitively carries out the processing of generating the sweep signals, whereby the radar transponder 4 can emit the response electric waves 6 corresponding to the two types of search radars.

As described above, according to the fourth embodiment, the sweep signals which are different in slope direction are sequentially and periodically generated. Therefore, even when plural search radars used to search and detect the radar transponder process sweep signals which are different in slope direction, the radar transponder 4 can be detected with a high probability.

In the foregoing description, the second sweep signals 40b are not generated unless a predetermined number of first sweep signals 40a are generated. However, the first and second sweep signals 40a and 40b may be alternately generated. That is, the sweep signal generator 14 may be constructed so that after it generates a first sweep signal 40a, it generates a second sweep signal 40b sequentially to the first sweep signal 40a, and then generates another first sweep signal 40a sequentially to the second sweep signal 40b. According to this construction, the response electric waves 6 corresponding to the first and second sweep signals 40a, 40b can be emitted more frequently as compared with the case described above, and thus the response electric waves 6 can be captured with a higher probability by the search radars 2.

Further, in the foregoing description, the first and second sweep signals 40a, 40b have the same sweep time. However, the first sweep signals 40a may contain sweep signals which are different in sweep time, or the second sweep signals 40b may contain sweep signals which are different in sweep time as in the case of the second embodiment.

[Fifth Embodiment]

Figures 10A, 10B:
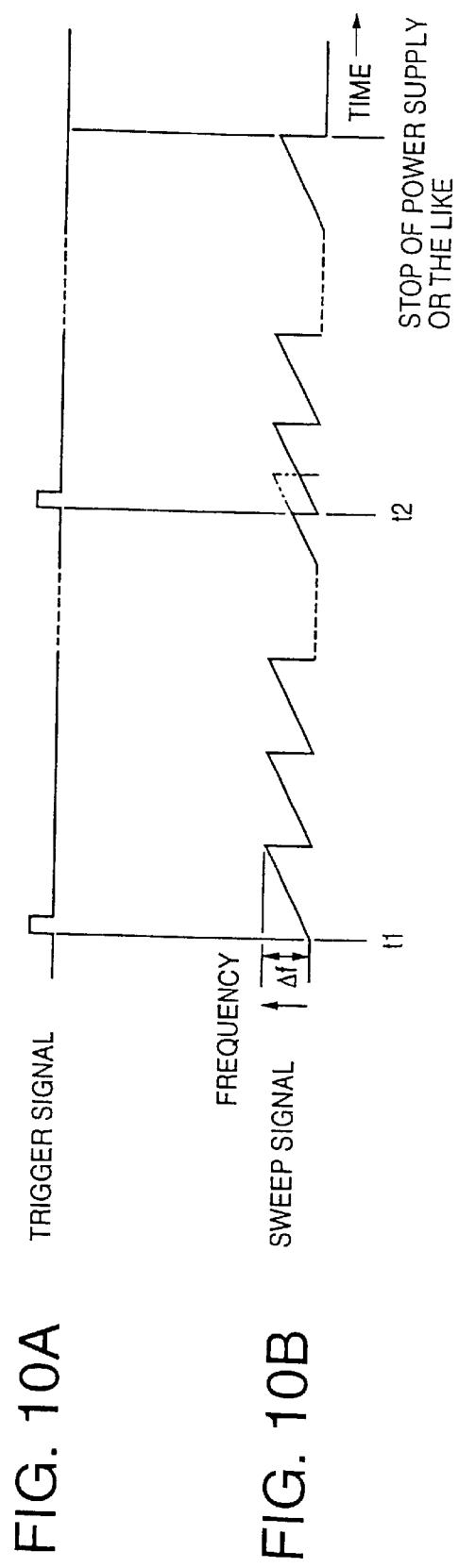
FIG. 10A is a waveform diagram showing trigger signals.
FIG. 10B is a waveform diagram showing sweep signals generated in a radar transponder according to a fifth embodiment of the present invention.

FIG. 10 is a waveform diagram showing the sweep signals in a radar transponder 4 according to a fifth embodiment.

In the first embodiment, only the radar electric wave which is first received is used as a trigger signal for generating sweep signals. On the other hand, in the fifth embodiment, all the radar electric waves which are received are used as trigger signals for generating sweep signals.

More specifically, as described above, the VCO controller 14a sequentially supplies the voltage signals indicating the sweep information to the VCO unit 14b when a trigger signal is supplied from the receiver 13 (at a timing t1). As a result, the VCO unit 14b sequentially generates sweep signals having a predetermined waveform as shown in (b) of FIG. 10.

In this situation, when another trigger signal is supplied from the receiver 13 to the VCO controller 14a (at a timing t2), the VCO controller 14a temporarily clears (stops) the current output operation of the voltage signals, and then restarts to output the voltage signals indicating the sweep information. As a result, the VCO unit 14b generates sweep signals starting from the timing t2 (indicated by a solid line) in place of the sweep signals which would be generated in the first embodiment as indicated by a two-dotted chain line.

Subsequently, the VCO controller 14a and the VCO unit 14b repeats the same processing, and forcedly finishes the generation of the sweep signals in response to the fact that the stop condition based on the external factor such as the stop of power supply or the like is satisfied.

As described above, according to the fifth embodiment, since all the radar electric waves received are used as trigger signals for generating sweep signals, the existence (locating) direction of the radar transponder 4 and the distance to the radar transponder 4 can be detected by all the search radars 2 which are searching the radar transponder concerned.

More specifically, the search radar 2 can detect both the locating direction of the radar transponder and the distance to the radar transponder by receiving the respond electric wave 6 to the radar electric wave 5 emitted from the search radar 2 concerned. When only the first radar electric wave 5 is used as the trigger signal as in the case of the first embodiment, search radars 2 which emit second and subsequent radar electric waves 5 can detect the incoming direction of the response electric wave 6, but cannot detect the distance to the radar transponder 4. Of course, the distance to the radar transponder can be calculated by intercommunicating the detection directions of plural search radars with one another and performing the triangulation on the basis of the information thus intercommunicated. However, the distance to the radar transponder cannot be estimated by only an individual search radar 2.

When all the radar electric waves are used as trigger signals as in the case of this embodiment, all the response electric waves to the radar electric waves emitted may be received by all the search radars 2. Accordingly, not only the incoming direction of the response electric waves, but also the distance to the radar transponder may be detected by each search radar 2 alone. Therefore, the detection of the radar transponder 4 can be quickly performed, and the lifesaving, etc. can be more strongly assisted.

In FIG. 10, one type of sweep signals sloped so that the oscillating frequency is increased with the time lapse like the first embodiment are generated. However, all the radar electric waves may be also used as trigger signals in a case where one type of sweep signals sloped so that the oscillating frequency is reduced with the time lapse as shown in FIG. 5 are generated. Further, when plural sweep signals which are different in sweep time as in the case of the third embodiment are generated, and also when the slope direction of the sweep signal is periodically varied as in the case of the fourth embodiment, all the radar electric waves may be also used as the trigger signals.

What is claimed is:

1. A radar transponder comprising:

a trigger signal output unit for outputting a trigger signal in response to a predetermined trigger generating condition; and a transmitter for continually generating plural sweep signals in response to the output of the trigger signal from said trigger signal output unit until a stop condition based on an external factor is satisfied, and transmitting a response electric wave corresponding to the sweep signals.

2. The radar transponder as claimed in claim 1, wherein the stop condition based on the external factor is that power supply to said transmitter is stopped or that emission stop of the response electric wave is manually instructed.

3. The radar transponder as claimed in claim 1, wherein the stop condition based on the external factor is that a radar electric wave transmitted from a search radar is received, that emission of the response electric wave is manually instructed, that a predetermined fixed amount or more seawater is detected or that a predetermined fixed amount or more impact is detected.

4. The radar transponder as claimed in claim 1, wherein said transmitter starts to continually generate the sweep signals in response to only the first trigger signal output from said trigger signal output unit.

5. The radar transponder as claimed in claim 1, wherein said trigger generating condition is that a radar electric wave transmitted from a search radar is received, and said transmitter starts to continually generate the sweep signals every time a trigger signal is output from said trigger signal output unit.

6. The radar transponder as claimed in claim 1, wherein said transmitter periodically generates plural sweep signals which are different in waveform.

7. The radar transponder as claimed in claim 6, wherein the waveform of each sweep signal is determined in accordance with the type of a search radar transmitting a radar electric wave.

8. The radar transponder as claimed in claim 1, wherein each sweep signal is sloped in a predetermined slope direction.

9. The radar transponder as claimed in claim 1, wherein said transmitter periodically generates sweep signals which are sloped in different slope directions.

10. A radar transponder comprising:
    an antenna configured to receive a search radar signal transmitted from a search radar;
    a sweep signal generator; and
    a trigger signal output unit electrically connected to said antenna and also electrically connected to the sweep signal generator, the trigger signal output unit being configured to output a trigger signal in response to reception of the search radar signal;
    wherein the sweep signal generator continuously and repetitively generates sweep signals until a stop condition based on an external factor is satisfied.

11. The radar transponder as claimed in claim 10, wherein the sweep signals are repetitively generated for a continuous duration determined by an amount of time between a beginning of the sweep signal defined by the trigger signal and an ending of the sweep signal defined by an occurrence of the external factor being satisfied.

12. The radar transponder as claimed in claim 10, wherein the stop condition based on the external factor is satisfied upon a reduction in power from a power generator.

13. The radar transponder as claimed in claim 10, wherein the stop condition based upon the external factor is satisfied upon manual intervention.

14. The radar transponder as claimed in claim 10, wherein the stop condition based on the external factor is satisfied upon detecting a predetermined amount of sea water.

* * * * *